(12) United States Patent
Hong et al.

(10) Patent No.: US 8,339,727 B1
(45) Date of Patent: *Dec. 25, 2012

(54) TRANSITIONING BETWEEN MODES OF CONTROL FOR MOTOR OF RECORDING DEVICE

(75) Inventors: Jye Sheng Hong, Singapore (SG); Siew Yong Chui, Singapore (SG)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/349,507

(22) Filed: Jan. 12, 2012

Related U.S. Application Data

(63) Continuation of application No. 12/704,288, filed on Feb. 11, 2010, now Pat. No. 8,107,187.

(60) Provisional application No. 61/155,688, filed on Feb. 26, 2009.

(51) Int. Cl.
*G11B 5/596* (2006.01)

(52) U.S. Cl. .............. 360/78.06; 360/78.04; 360/77.02

(58) Field of Classification Search .................. None
See application file for complete search history.

(56) References Cited

U.S. PATENT DOCUMENTS

| 7,504,789 | B1 | 3/2009 | Chui et al. |
| 7,531,975 | B1 | 5/2009 | Rana et al. |
| 7,602,131 | B1 | 10/2009 | Chui |
| 8,107,187 | B1 * | 1/2012 | Hong et al. ............... 360/78.06 |
| 2002/0181141 | A1 | 12/2002 | Kuroiwa et al. |

OTHER PUBLICATIONS

Krishnamoorthy et al., "Voltage Mode Using Pseudo Current Limit", in U.S. Appl. No. 12/177,084, filed Jul. 21, 2008.
Ito et al., "Down Sampling Method for Hard Disk Speed Control Loop", in U.S. Appl. No. 12/629,575, filed Dec. 2, 2009.

* cited by examiner

*Primary Examiner* — Andrew L Sniezek

(57) ABSTRACT

The present disclosure includes systems and techniques relating to control of recording devices, such as disk drives. A described technique includes controlling a motor to actuate a head about a surface of a rotating recording medium, the motor being associated with first and second states of electric current, where a duration of the first state is longer than a duration of the second state; detecting an instance of the first state; and initiating, when the instance of the first state is detected, a switch from a first mode to a second mode to control the motor. The switch can be based on a condition of operation with respect to the rotating recording medium.

22 Claims, 14 Drawing Sheets

TRANSITIONING BETWEEN MODES OF CONTROL FOR MOTOR OF RECORDING DEVICE

CROSS REFERENCE TO RELATED APPLICATION

This patent document is a continuation, and claims the benefit of priority under 35 USC 120, of U.S. patent application Ser. No. 12/704,288 now U.S. Pat. No. 8,107,187, filed Feb. 11, 2010, and entitled "Transitioning Between Modes of Control for Motor of Recording Device," which claims the benefit of the priority of U.S. Provisional Application Ser. No. 61/155,688, filed Feb. 26, 2009, and entitled "Voice Coil Motor Controller Smooth Transition From Digital to Analogue Mode." All of the above identified applications are incorporated herein by reference in their entirety.

BACKGROUND

The subject matter of this application is related to control of recording devices, such as hard disk drives.

Storage devices such as a disk drive can store data on circular, concentric tracks on a disk surface. For example, a disk drive can include one or more rotatable recording disks, which can be optical or magnetic, and are axially aligned and mounted to a spindle motor for rotation. A disk drive can include one or more read-write heads configured to retrieve and record data on a magnetic layer of a rotating disk as the head flies on a cushion of air over the disk surface. When retrieving data, magnetic field variations perceived by a read-write head are converted into an analog electrical signal, the analog signal can be amplified, converted to a digital signal, and interpreted.

A disk drive can use various motors for actuating different drive components. For example, a disk drive can control a motor, e.g., spindle motor, to rotate a structure holding one or more disks. The disk drive can control a different motor, e.g., voice coil motor (VCM), to move a read-write head about a surface of a disk.

SUMMARY

The present disclosure includes systems and techniques for operating a recording device, such as a disk drive.

Systems and techniques for operating a disk drive can include controlling a motor to actuate a head about a surface of a rotating recording medium, switching from a first mode to a second mode to control the motor, based on a condition of operation with respect to the rotatable recording medium, and synchronizing the switching from the first mode to the second mode based on a state of electric current associated with the motor.

These, and other implementations, can include one or more of the following features. Implementations can include selecting a state of the first mode based on data indicative of the electric current supplied to the motor in the first mode over one or more periods such that the selected state is longer than a start-up time associated with the second mode. Synchronizing the switching can include initiating the switching at a beginning portion of the selected state. Selecting the state can include determining a duty cycle based on one or more waveforms associated with the first mode. Selecting the state of the first mode can include accessing a current loop current digital-to-analog value associated with the first mode. Selecting the state of the first mode can include measuring the current to the motor. In some implementations, the first mode is a power modulation mode, and the second mode is a linear mode. Controlling the motor can include using the first mode to control a voice coil motor for a seeking operation that includes moving the head to a specific track on the rotating recording medium. Controlling the motor can include using the second mode to control the voice coil motor for a track following operation that includes maintaining the head on a specific track on the rotating recording medium.

In some cases, the state of electric current associated with the motor can be indicative of a discharging state associated with the motor and the first mode. Synchronizing the switch can include initiating the switch at a beginning of the discharging state. A duration of the discharging state can be longer than a duration of a charging state associated with the motor and the first mode. In some cases, the state of electric current associated with the motor can be indicative of a charging state associated with the motor and the first mode. Synchronizing the switch can include initiating the switch at a beginning of the charging state. A duration of the charging state can be longer than a duration of a discharging state associated with the motor and the first mode.

The described systems and techniques can be implemented in electronic circuitry, computer hardware, firmware, software, or in combinations of them, such as structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, the disclosed embodiments below can be implemented in various systems and apparatus, including, but not limited to, a special purpose data processing apparatus (e.g., a wireless access point, a remote environment monitor, a router, a switch, a computer system component, a medium access unit), a mobile data processing apparatus (e.g., a wireless client, a mobile telephone, a personal digital assistant (PDA), a mobile computer, a digital camera), a general purpose data processing apparatus (e.g., a minicomputer, a server, a mainframe, a supercomputer), or combinations of these.

Thus, according to another aspect of the described systems and techniques, apparatuses and systems can include circuitry configured to control a motor to actuate a head about a surface of a rotatable recording medium; circuitry configured to switch from a first mode to a second mode to control the motor, the switching based on a condition of operation with respect to the rotatable recording medium; and circuitry configured to synchronize the switch from the first mode to the second mode based on a state of electric current associated with the motor.

These, and other implementations, can include one or more of the following features. Implementations can include circuitry configured to select a state of the first mode based on data indicative of the electric current supplied to the motor in the first mode over one or more periods such that the selected state is longer than a start-up time associated with the second mode. Circuitry configured to synchronize can include circuitry configured to initiate the switch at a beginning portion of the selected state. Circuitry configured to select the state of the first mode can include circuitry configured to determine a duty cycle based on one or more waveforms associated with the first mode. Circuitry configured to select the state of the first mode can include circuitry configured to access a current loop current digital-to-analog value associated with the first mode. In some implementations, the first mode is a power modulation mode and the second mode is a linear mode.

In some cases, the state of electric current associated with the motor is indicative of a discharging state associated with the motor and the first mode. The circuitry can be configured to synchronize is configured to initiate the switch at a beginning of the discharging state, wherein a duration of the discharging state is longer than a duration of a charging state associated with the motor and the first mode. In some cases, the state of electric current associated with the motor is indicative of a charging state associated with the motor and the first mode. The circuitry configured to synchronize can be configured to initiate the switch at a beginning of the charging state. A duration of the charging state can be longer than a duration of a discharging state associated with the motor and the first mode In another aspect, systems and apparatus can include a rotatable recording medium; a head to read and/or write data to the rotatable recording medium; a motor configured to actuate the head about a surface of the rotatable recording medium; a driver configured to supply current to the motor to operate the motor using a first mode and a second mode; and a controller configured to operate to the driver to switch from the first mode to the second mode based on a condition of operation with respect to the rotatable recording medium and synchronize the switching from the first mode to the second mode based on a state of electric current associated with the motor.

The subject matter described in this specification can be implemented to realize one or more of the following potential advantages. The described techniques and systems can minimize motor current ripple when switching modes. The described techniques and systems can provide power and operation efficiency. The described systems and techniques can produce a smooth transition between a power modulation mode and a linear mode. Various indications of a smooth transition can include a low or non-existent current ripple and faster settling time.

Details of one or more implementations are set forth in the accompanying drawings and the description below. Other features, objects, and advantages may be apparent from the description and drawings, and from the claims.

DRAWING DESCRIPTIONS

Like reference symbols in the various drawings indicate like elements.

DETAILED DESCRIPTION

Figure 1:
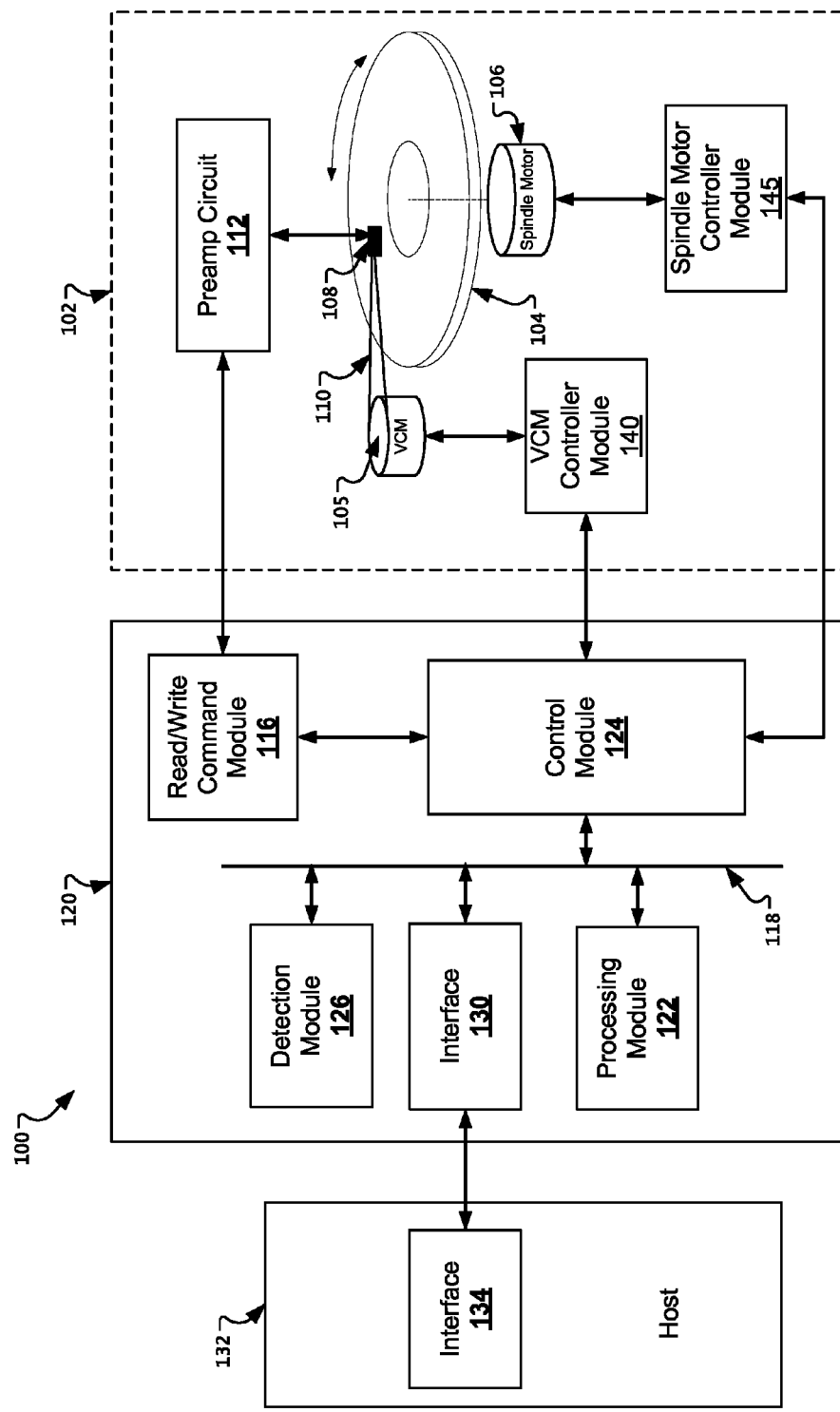
FIG. 1 shows an example of a hard disk drive system.

FIG. 1 shows an example of a hard disk drive system. In this example, a hard disk drive (HDD) system 100 includes a HDD assembly 102 and a printed circuit board (PCB) 120. In some implementations, the PCB 120 is mechanically attached to the HDD assembly 102 and receives/sends electrical input/output to one or more components of the HDD assembly 102.

The HDD assembly 102 can include one or more magnetic disks or platters 104 for storing magnetic data. The platter(s) 104 can be rotated by a spindle motor 106. The spindle motor 106 can rotate the magnetic platter(s) 104 at a controlled speed during the read/write operations. A read/write arm 110 can move relative to the magnetic platters 104 in order to read and/or write data to/from the magnetic platters 104 via one or more read/write head(s) 108. The read/write head 108 can be located near a distal end of the read/write arm 110. The read/write head 108 can include a write element (e.g., an inductor) that generates a magnetic field, and a read element (e.g., a magneto-resistive (MR) element) that senses the magnetic field on the magnetic platter(s) 104.

The VCM 105 can be an element of a head-positioning servo system. In some implementations, the VCM 105 is configured to apply torque to the read/write head 108 to swing the read/write head 108 during a track-seeking operation and to maintain the head 108 at a desired angular position during a track-following operation.

The PCB 120 includes a processing module 122, a control module 124, a detection module 126, and a communications interface 130, each of which is connected through a bus 118. The processing module 122 can perform data and/or control processing related to the general operation of the HDD system 100. For example, the processing module 122 can execute instructions received from the control module 124 to control disk drive functions. These functions can include, for example, reading and decoding host commands, starting up and controlling the speed of the spindle motor 106, minimizing head positioning servo off track error through the control of the VCM 105, and managing power consumption of the HDD system 100.

The processing module 122 can include memory to store, for example, temporary control data associated with the control of the HDD system 100, and non-volatile memory such as flash memory for storing, for example, HDD control code. The processing module 122 can be configured to access non-volatile memory upon power-up to perform HDD initialization procedures. In some implementations, the processing module 122 can store various firmware routines for controlling the operation of the spindle motor 106 such as startup routines, speed control routines, spin down routines, and parking routines.

The processing module 122 can function to manage and handle data transfer between the HDD system 100 and a host 132 such as a computer during read and write operations through the communications interfaces 130, 134 located on the HDD system 100 and the host 132 respectively. For example, the processing module 122 can receive a command from the host 132, to generate a read or write command via a communication interface 130. The processing module 122 also can include servo logic for managing the positioning of the read/write head 108 when seeking (e.g., moving from one track to an adjacent or non-adjacent track) and during track following (e.g., staying on a single track).

The control module 124 can communicate with the processing module 122 to operate various components of the HDD system 100 such as the VCM 105, spindle motor 106, and read/write head 108. In some implementations, the detection module 126 can monitor a current supplied to the VCM 105 and can communicate VCM current information to a module such as a control module 124, a VCM controller module 140, or both. In some implementations, the control module 124 can operate the VCM 105 via a VCM controller module 140. In some implementations, the control module 124 can operate the spindle motor 106 to rotate the platter(s) 104 via a spindle motor controller module 145.

The VCM controller module 140 can include multiple mechanisms to control the VCM 105 in different modes. In some implementations, the VCM controller module 140 can include a phase shift modulation (PSM) mode mechanism to operate the VCM 105 during track seeking. In some implementations, the VCM controller module 140 can include a pulse width modulation (PWM) mode mechanism to operate the VCM 105 during track seeking. In some implementations, the VCM controller module 140 can receive VCM control signals from a PWM controller in the control module 124 and generate a corresponding signal to move the VCM 105 to position the arm 110 and the read/write head 108, for example, as part of a read or write operation. The VCM controller module 140 can include a linear mode mechanism to operate the VCM 105 during track following. In some implementations, the controller module 124 can include a PSM controller to generate control signals so as to control the VCM controller module 140. In some implementations, the control module 124 can include the VCM controller module 140.

The control module 124 can include a PWM controller for generating control signals so as to control the spindle motor controller module 145 to drive the spindle motor 106 at a substantially constant speed while the disk drive is in use. The spindle motor controller module 145, in some implementations, can include an electromotive force (EMF) detector for detecting a back EMF (BEMF) associated with one or more windings of the spindle motor 106. The control module 124 can communicate with the spindle motor controller module 145, for example, to receive zero crossing information to be used for identifying the instant at which a zero crossing occurs (e.g., a zero crossing in the BEMF induced in a floating winding), and for determining a spin-rate of the spindle motor 106. As an example, while the spindle motor 106 is rotating, the EMF detector can detect the BEMF zero crossing point for an un-driven winding to generate a zero crossing signal (e.g., by counting clock pulses and determining time elapsed between the consecutive detected zero crossings). The control module 124 can receive the zero crossing signal and provide the zero crossing information to the processing module 122 to compute the velocity of the spindle motor 106. In some implementations, the control module 124 can include the spindle motor controller module 145.

The control module 124 can use a read/write command module 116 to read or write data to one or more platters 104. During write operations, the read/write command module 116 can encode (e.g., using run length limited coding (RLL)) data to be written by the read/write head 108 and generate encoded write signals. The read/write command module 116 can process the write signals providing a reliability check and can apply, for example, error correction coding (ECC) and similar algorithms to insure the integrity of the data that is written. During read operations, the read/write head 108 can generate read signals (e.g., analog signals), and the read/write command module 116 can convert the read signals into digital read signals. The converted signals can be detected and decoded by conventional techniques to recover data written by the read/write head 108.

The read/write command module 116 can interface with a preamp circuit 112 in the HDD assembly 102. The preamp circuit 112 can operate either in a read mode or write mode, and can communicate with one or more transducers in a read-write head 108. A transducer can generate a low level analog read signal, and send the analog read signal to the preamp circuit 112 to produce an amplified read signal. During a user-data read operation, the amplified read signal serially defines the servo information and user data. The servo information can include positioning data information such as track identification data information and fine positioning information. During a write operation, the preamp circuit 112 also can provide write current via a write data signal to a selected transducer for writing a sequence of symbols onto the platter(s) 104. The write current changes polarity upon each change in the binary value of the write data signal.

The processing module 122 can include a memory for storing programming codes to be executed by the processor. In some implementations, the processing module 122 can include a spindle speed controller (not shown) for maintaining accurate spindle speed control based on the velocity feedback signals monitored by the detection module 126, the control module 124, or combinations thereof. In response to the velocity feedback signals, the spindle speed controller can adjust a commanded output current to correct for variations from the desired speed, and control the spindle motor's speed using the adjusted output current. If the available current is insufficient to maintain accurate control, the processing module 122 can increase the commutation phase advance to achieve the required current.

The HDD assembly 102 can rotate a disk at a target rate using the spindle motor 106 and perform a read/write operation using a head (e.g., the read/write head 108). When activated, the HDD assembly 102 can initialize a series of startup operations such as spinning up the spindle motor 106 to a desired rotating speed/velocity and maintaining the rotating speed/velocity of the spindle motor 106 at a desired operating rate. In some cases, the delay that the HDD assembly 102 incurs during initialization is a function of the time lapse from the time of powering up the HDD assembly 102 to the time when data can first be read from or written by the HDD assembly 102.

When a disk drive is initialized (e.g., from a reset condition), the control module 124 can execute an initialization sequence to place the HDD assembly 102 in an operational state. This initialization sequence can vary from disk drive to disk drive but generally involves initial tests (or start-up tests) of the various components or sub-systems of the HDD system 100, after appropriate parameters and commands have been loaded for use during the disk drive operations. The spindle motor 106 can continue to accelerate until a speed threshold sufficient to aerodynamically support the read/write head 108 over the magnetic platters 104 is met. After initialization is complete, the processing module 122 can communicate with the host 132 to receive data transfer commands.

The initialization sequence can be activated while the disk drive is at rest (e.g., when the platter(s) 104 is not spinning). However, a momentary power drop in the HDD system 100 can cause a reset condition, and this reset condition can force the HDD system 100 to reinitialize even when the disk drive (e.g., the spindle motor 106 and the platters 104) is still spinning.

Thus, in some implementations, it is desirable to determine whether the disk drive is actually spinning upon initialization, since the state of the spindle motor 106 can determine the appropriate manner in which drive signals are applied by the spindle/VCM driver 114 to accelerate the spindle motor 106 to the final desired operational velocity.

In some implementations, portions of the HDD system 100 can be implemented as one or more integrated circuits (IC) or chips. For example, the processing module 122 and the control module 124 can be implemented in a single chip. In some implementations, the VCM controller module 140, spindle motor controller module 145, the read/write command module 116 can be implemented in a same (or different) chip as the processing module 122 and the control module 124. A system-on-chip architecture can be implemented that incorporates one or more components of the HDD system 100. In some implementations, two or more modules depicted by FIG. 1 can be integrated as a single module, e.g., the processing module 122 and the control module 124 can be implemented as a single module.

A HDD system can use a current control loop (CCL) to control a motor such as a VCM to position a HDD head about a disk. The CCL can be implemented in analog circuitry and can include or interface with digital circuitry. By controlling the current through the VCM, the HDD system is controlling the torque exerted on the HDD head. Therefore, the control of the current can determine how well the HDD head can be positioned on the disk.

Various modes can be used to control a CCL. The modes can provide different combinations of power efficiency and positioning accuracy. Various examples of modes include a linear mode and power modulation modes such as a PWM mode or PSM mode.

When a linear mode is used to control the CCL, the efficiency of a HDD system can be represented as follows:

$$\text{Efficiency} = \frac{\text{Output Power}}{\text{Input Power}}$$
$$= \frac{I_{MOTOR}^2 * R_{MOTOR}}{V_{SUPPLY} * I_{MOTOR}}$$
$$= \frac{I_{MOTOR} * R_{MOTOR}}{V_{SUPPLY}}$$

where $I_{MOTOR}$ represents a current associated with the motor, $R_{MOTOR}$ represents a resistance associated with the motor, and $V_{SUPPLY}$ represents a supply voltage.

When a power modulation mode is used to control the CCL, the efficiency of a HDD system can be represented as follows:

$$\text{Efficiency} = \frac{\text{Output Power}}{\text{Input Power}}$$
$$= \frac{I_{MOTOR}^2 * R_{MOTOR}}{I_{MOTOR}^2 * (R_{MOTOR} + R_{DSON})}$$
$$= \frac{I_{MOTOR} * R_{MOTOR}}{I_{MOTOR} * (R_{MOTOR} + R_{DSON})}$$

where $I_{MOTOR}$ represents a current associated with the motor, $R_{MOTOR}$ represents a resistance associated with the motor, and $R_{DSON}$ represents a resistance associated with the power transistors when they are fully turned on.

Based on $V_{SUPPLY} \geq I_{MOTOR} * (R_{MOTOR} + R_{DSON})$, the power modulation mode can provide greater efficiency. A power modulation mode can control the average current to a VCM. In some implementations, the power modulation mode can cause current ripple. Large current ripples may make a power modulation mode inadequate for HDD track following, e.g., such as when the HDD is performing read or write operations.

This specification provides, among other things, descriptions of systems and techniques that combine linear and power modulation modes to control a motor such as a VCM or a stepper motor. In some implementations, a HDD can use a PSM mode for seek operation until a specified track is within range and then switch back to linear mode for track following. Some implementations can use multiple circuits such as a linear mode circuit and a power modulation mode circuit to control the same power transistor(s) that control the VCM. The described systems and techniques can include a mode switching mechanism to control transitions between the modes. The described systems and techniques can produce a smooth transition between a power modulation mode and a linear mode. Various indications of a smooth transition can include a low or non-existent current ripple and faster settling time. The described systems and techniques can ensure a smooth transition and minimal current variation between different modes of a current control loop.

Figure 2:
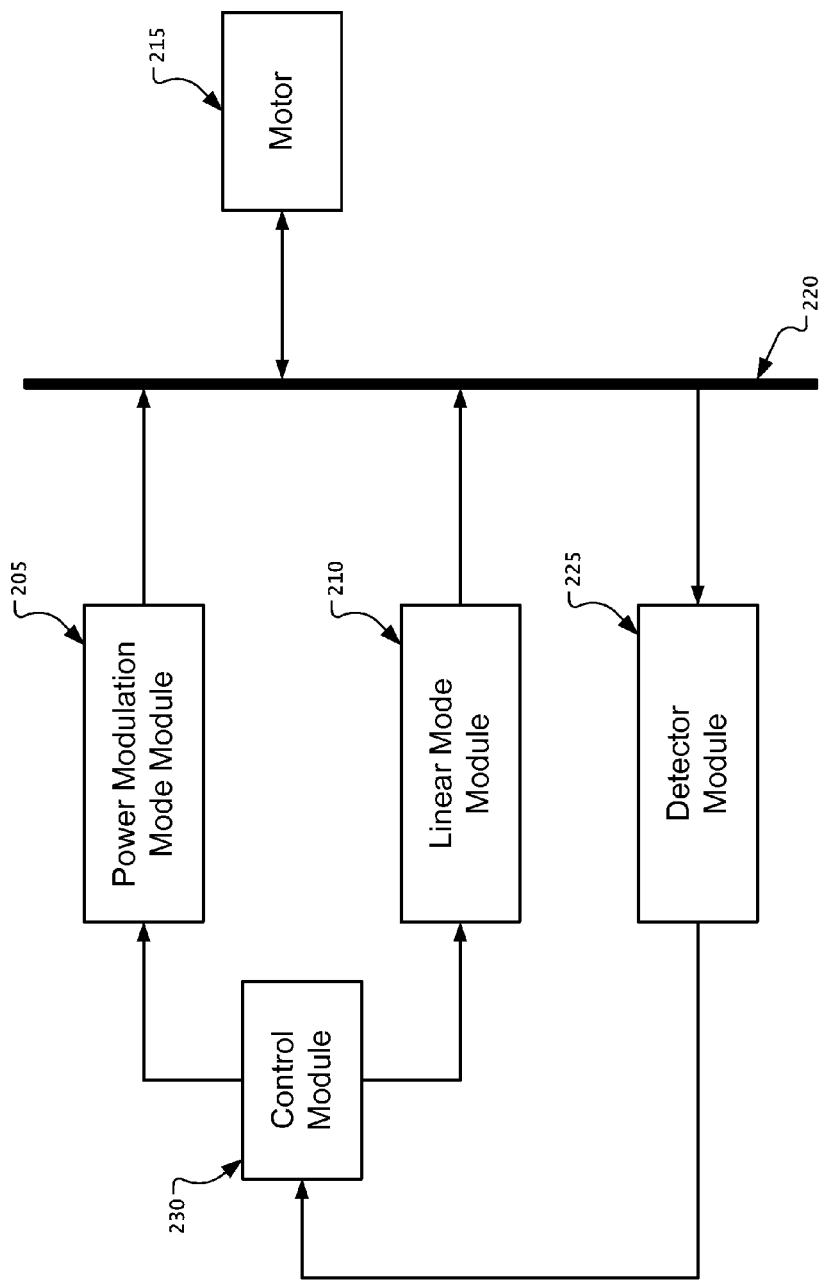
FIG. 2 shows an example of a dual mode motor architecture.

FIG. 2 shows an example of a dual mode driver architecture. A HDD system can include a power modulation mode module 205 and a linear mode module 210 to operate a motor 215 such as a voice coil motor. In some implementations, the power modulation mode module 205 and the linear mode module 210 can supply current to the motor 215 via an electrical connection 220. A detector module 225 can monitor electrical current fluctuations on the electrical connection 220 to and from the motor 215 to determine a suitable transition instance. In some implementations, a detector module 225 can detect a transition between different states of a power modulation mode. A control module 230 can communicate with the detector module 225 to receive an indication of a transition. The control module 230 can operate the power modulation mode module 205 and linear mode module 210 based on the received indication. For example, the control module 230 can operate the power modulation mode module 205 to provide current to the motor 215. Based on an indication of a transition between states during a period when the power modulation mode module 205 is providing current to the motor 215, the control module 230 can switch to operating the linear mode module 210 to provide current to the motor 215.

Figure 3A:
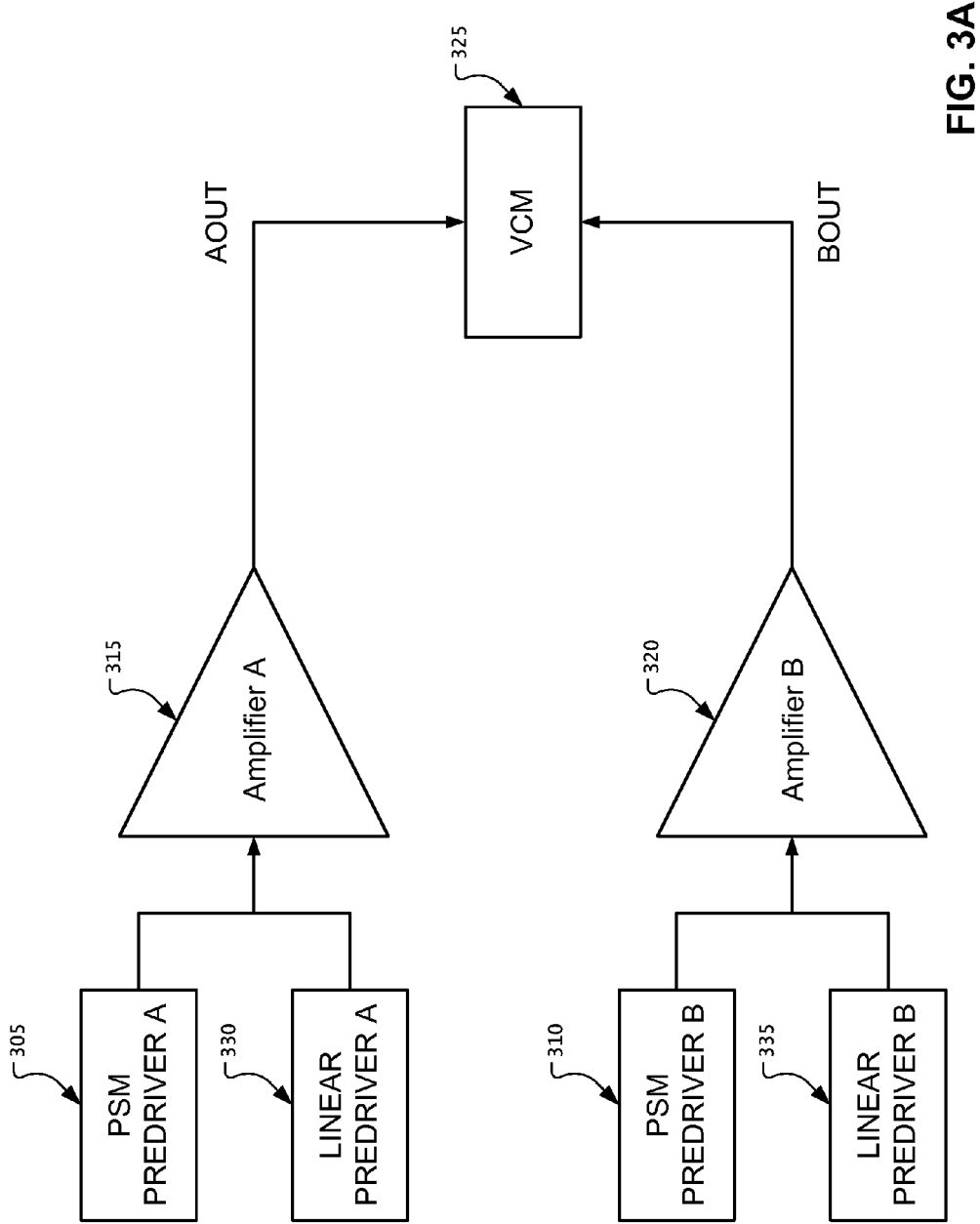
FIG. 3A shows another example of a dual mode driver architecture.

FIG. 3A shows another example of a dual mode driver architecture. A VCM driver includes PSM mode pre-drivers 305, 310 that supply input signals to respective amplifiers 315, 320. The VCM driver includes linear mode pre-drivers 330, 335 that supply alternate input signals to amplifiers 315, 320. The amplifiers 315, 320 are electrically coupled with a VCM 325. In this example, either the linear mode pre-drivers 305, 310 or the PSM mode pre-drivers 330, 335 are allowed to control respective amplifiers 315, 320 to drive the VCM 325 at any instant. The pre-drivers that are not in use can be tri-stated, e.g., placed in high impedance, to effectively disconnect them from the amplifiers 315, 320.

Figure 3B:
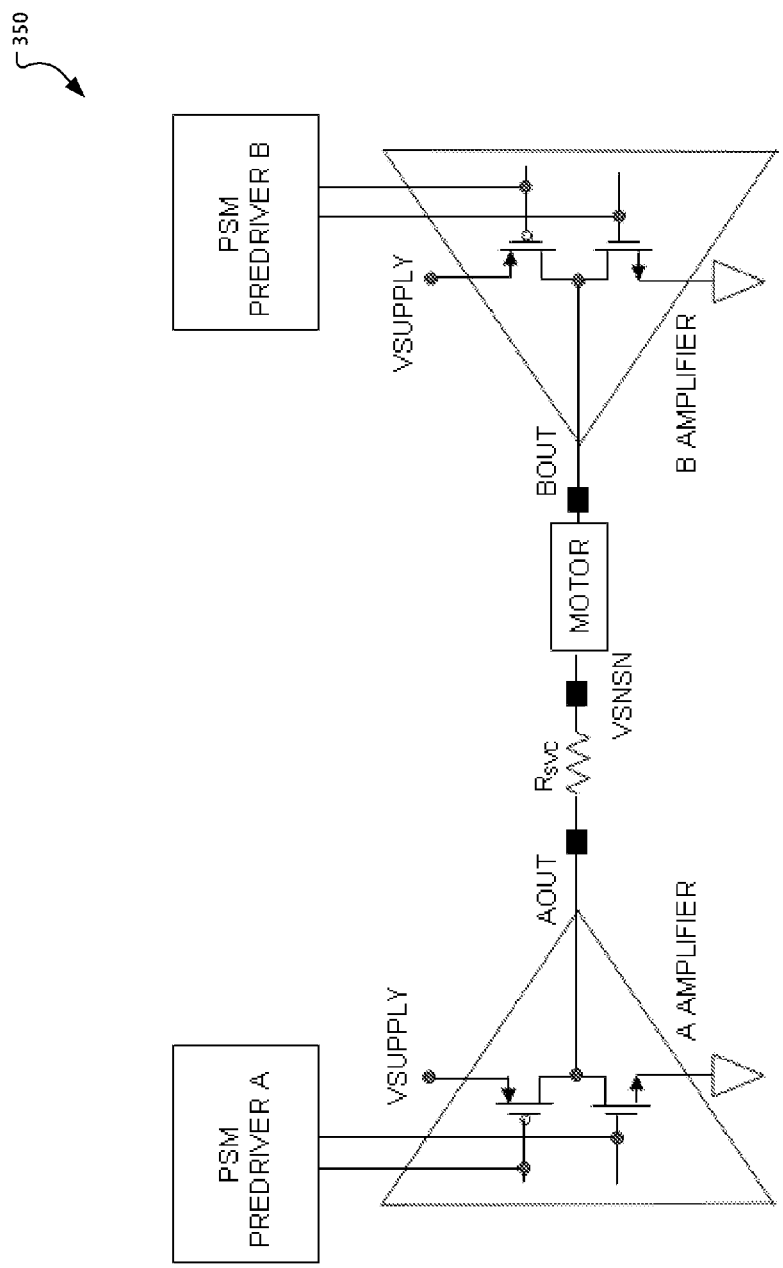
FIG. 3B shows an example of a dual mode driver and motor system.

FIG. 3B shows an example of a dual mode driver and motor system. A VCM driver system 350 can include PSM mode pre-drivers A and B that supply input signals to different amplifiers. The VCM driver system 350 can include linear mode pre-drivers that supply alternate input signals to amplifiers that drive a motor such as a voice coil motor. The amplifiers can include circuitry with multiple power transistors. In some implementations, a VCM driver system 350 can use a switching mechanism to switch between PSM mode pre-drivers and linear mode pre-drivers. In some implementations, a VCM driver system 350 can tri-active pre-drivers to deactivate them from the system 350.

In some implementations, during a switch from a PSM mode to a linear mode, the amplifier outputs of the system 350 can hold their existing state until the gate voltages of the power transistors are charged to a voltage level to regulate the current in a linear mode. The current used to charge the gates can be proportional to an amplifier's current consumption. To keep the current consumption low, the charging current can be kept small, however, this may cause a delay between the desired transition and the actual transition. A VCM driver system 350 can synchronize a switch from the PSM mode to the linear mode to minimize the motor current ripple. In some implementations, a VCM driver system 350 can be configured to make the switch from a PSM mode to a linear mode at an appropriate time such that a delay due to a slow charging of the gate voltages will not have an effect on the motor current ripple.

Figure 4:
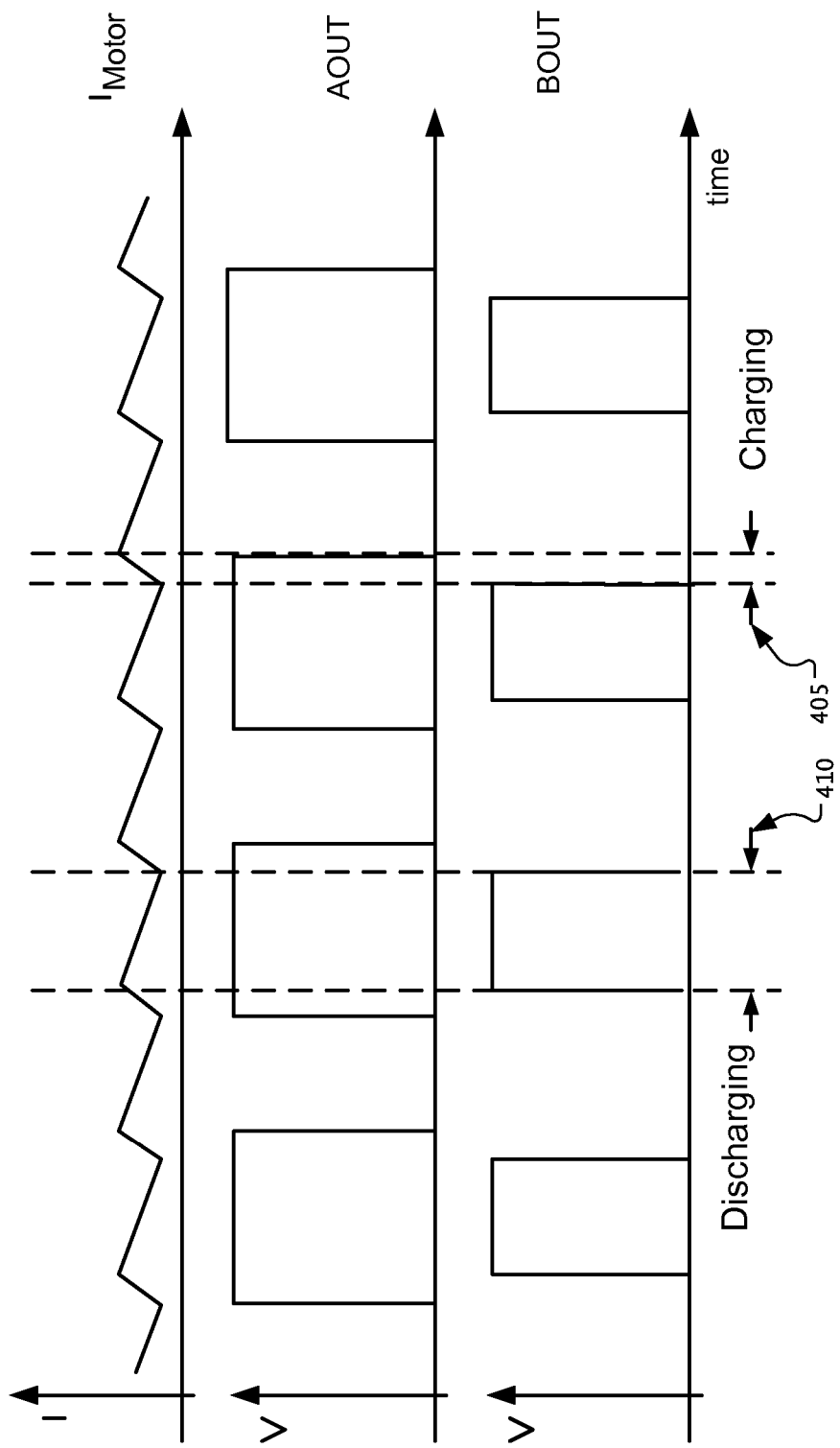
FIG. 4 shows an example of driver output voltages and motor current profiles associated with a low current a phase shift modulation (PSM) mode.

FIG. 4 shows an example of driver output voltages and motor current profiles associated with a low current PSM mode. A PSM mode can include charging 405 and discharging states 410. In some implementations, a charging state 405 represents a charge up of motor current and a discharging state 410 represents a discharge of motor current. FIG. 4 depicts driver output voltages and motor current profiles for several charging state 405 and discharging state 410 periods. During the charging state 405, the outputs are driven in the opposite direction (e.g., one output is high and the other is low) to charge up the motor. During the discharging state 410, both outputs are driven in the same direction (e.g., both high, or both low) and the motor current discharges due to the power dissipation in the motor.

In the case where the motor current is low, the duration of the discharging state can be longer than that of the charging state. In such cases, the switch between modes can be synchronized to take place at the beginning of a discharging state. As a power transistor can hold its pre-transition state, the motor current can continue to discharge while waiting for the linear pre-driver to take over control of the gates.

Figure 5A:
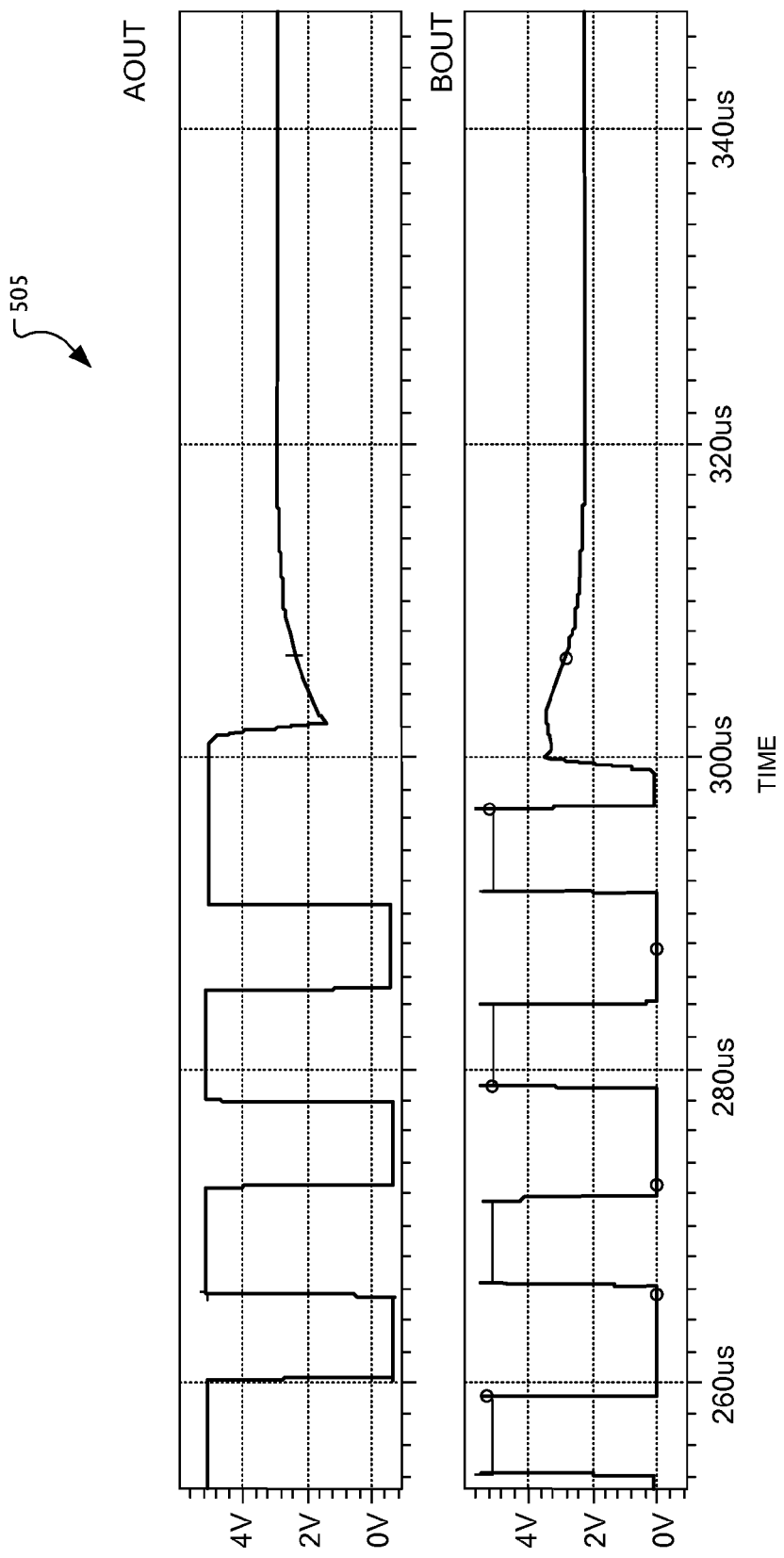
FIG. 5A shows an example of a voltage profile of a non-synchronized switch from a low current PSM mode to a linear mode.
Figure 5B:
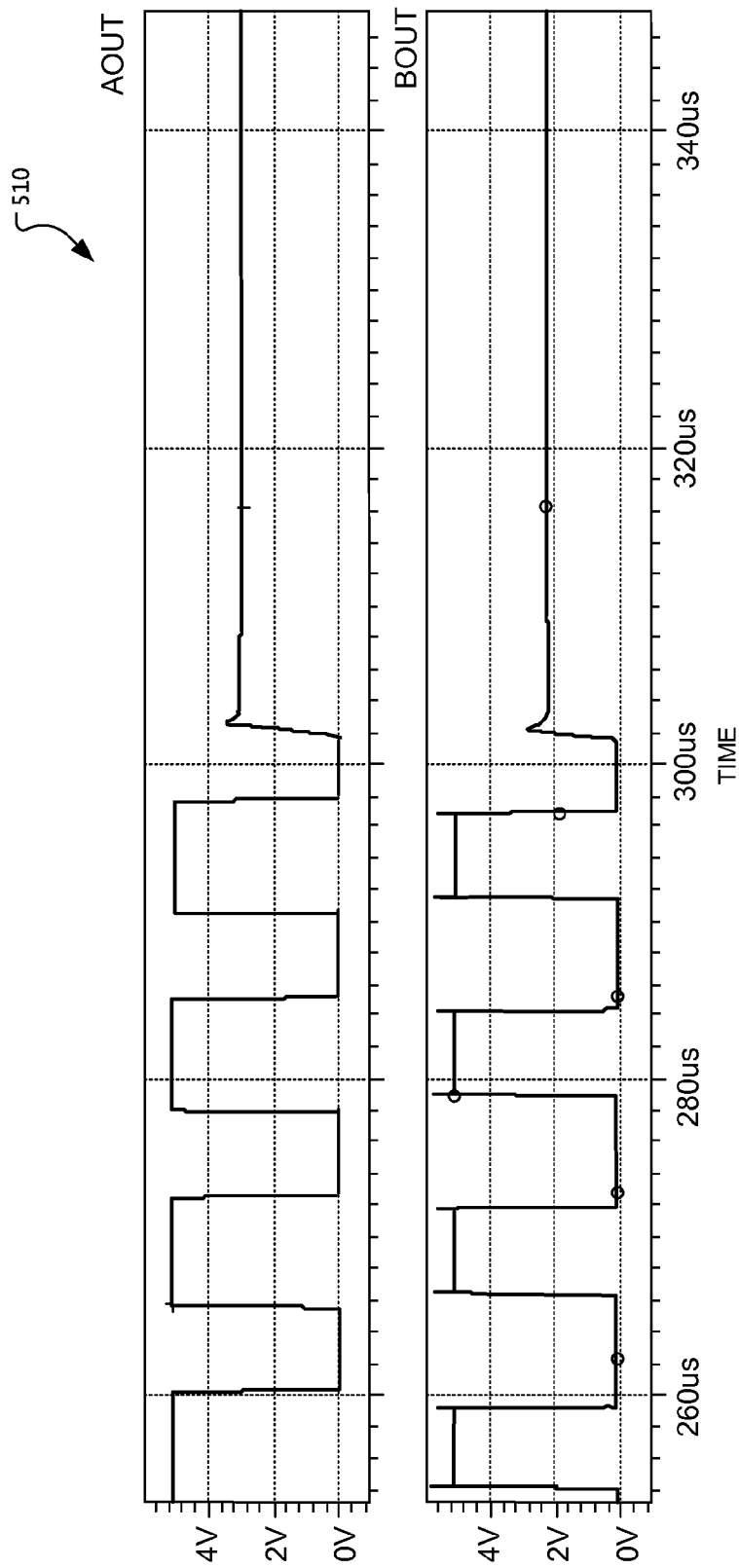
FIG. 5B shows an example of a voltage profile of a synchronized switch from a low current PSM mode to a linear mode.
Figure 5C:
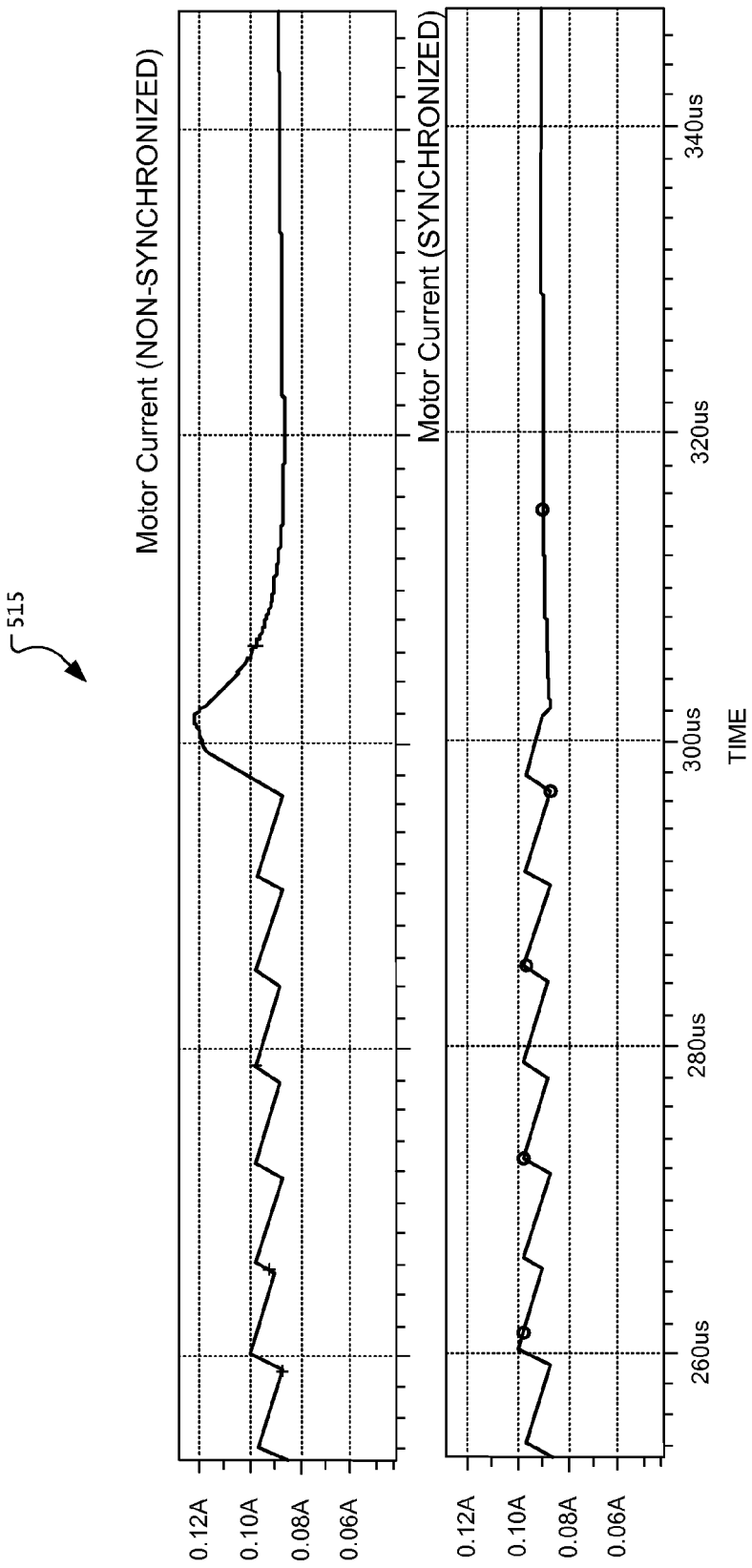
FIG. 5C shows an example of current profiles of synchronized and non-synchronized switches from a low current PSM mode to a linear mode.

FIGS. 5A, 5B, and 5C show examples of simulation results that include comparisons between a non-synchronized switch and a synchronized switch from a low current PSM mode to a linear mode. In a non-synchronized method, the switch can take place during a charging state of a PSM mode. As a result, the motor can continue to charge up and a large current ripple is observed during the switch. In contrast, using a synchronized method, the switch can take place at the beginning of the discharging state. The start up time of the linear pre-driver can be configured to be shorter than a discharging period of a low current PSM mode to minimize or eliminate current spikes to the VCM.

FIG. 5A shows an example of a voltage profile of a non-synchronized switch from a low current PSM mode to a linear mode. Graphs 505 include a voltage profile of AOUT and a voltage profile of BOUT that show a non-synchronized switch from a low current PSM mode to a linear mode. AOUT and BOUT correspond to respective amplifier output such as the amplifiers in VCM system 350.

FIG. 5B shows an example of a voltage profile of a synchronized switch from a low current PSM mode to a linear mode. Graphs 510 include a voltage profile of AOUT and a voltage profile of BOUT that show a synchronized switch from a low current PSM mode to a linear mode.

FIG. 5C shows an example of current profiles of synchronized and non-synchronized switches from a low current PSM mode to a linear mode. Graphs 515 include a motor current profile for a non-synchronized switch from a low current PSM mode to a linear mode and a motor current profile for a synchronized switch from a low current PSM mode to a linear mode. Note that the non-synchronized switch causes a greater motor current ripple than the synchronized switch.

Figure 6:
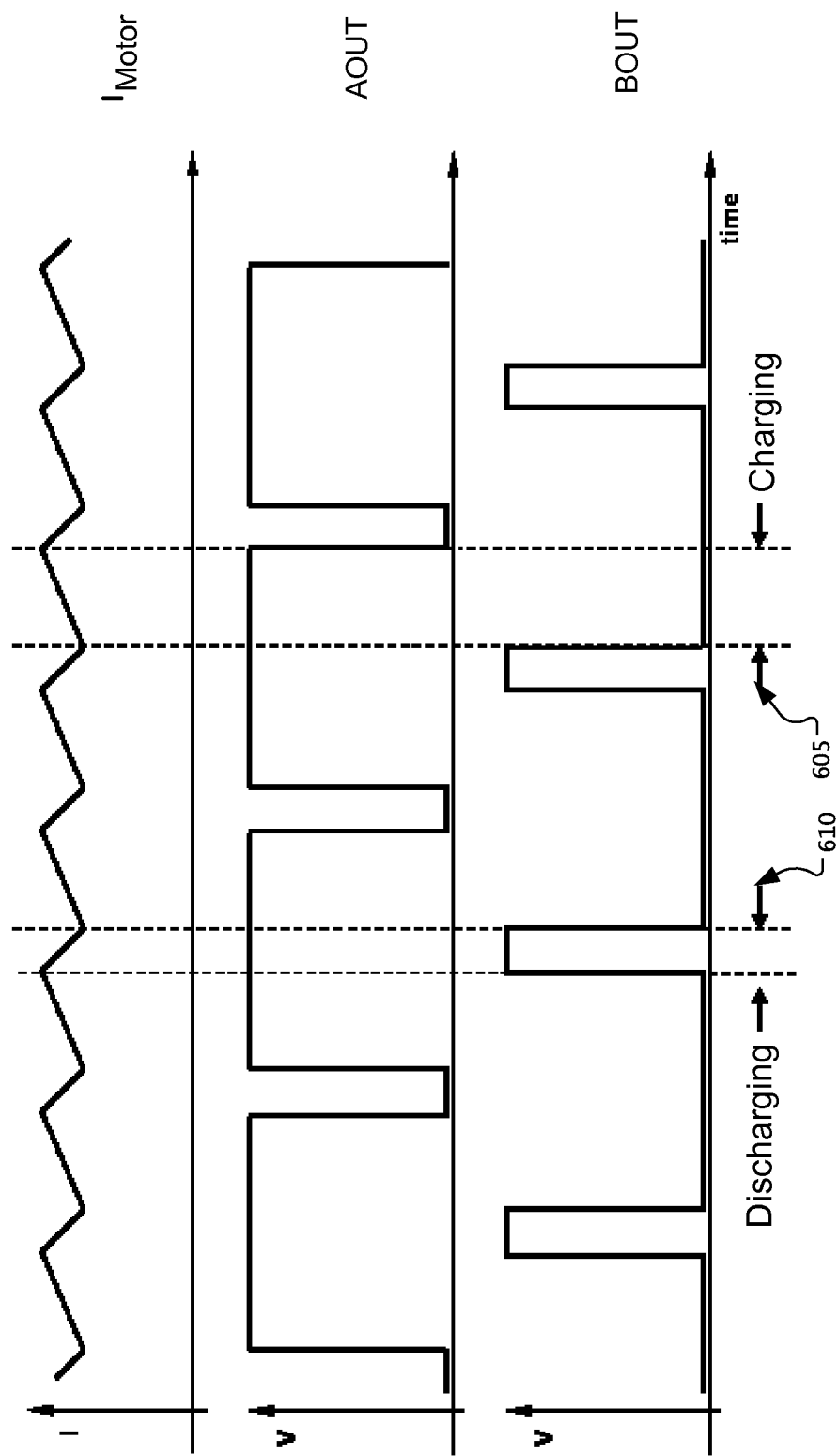
FIG. 6 shows an example of driver output voltages and motor current profiles associated with a high current PSM mode.

FIG. 6 shows an example of driver output voltages and motor current profiles associated with a high current PSM mode. A PSM mode can include charging 605 and discharging states 610. FIG. 6 depicts driver output voltages and motor current profiles for several charging state 605 and discharging state 610 periods. For the case when the motor current is high, the charging state 605 is longer than the discharging state 610. During the charging state 605, the outputs are driven in the opposite direction (e.g., one output is high and the other is low) to charge up the motor. During the discharging state 610, both outputs are driven in the same direction (e.g., both high, or both low) and the motor current discharges due to the power dissipation in the motor. In the case where the motor current is high, the duration of the charging state can be longer than that of the discharging state. In such cases, the switch between modes can be synchronized to take place at the beginning of a charging state. As a power transistor can hold its pre-transition state, the motor current can continue to charge while waiting for the linear pre-driver to take over control of the gates.

Figure 7A:
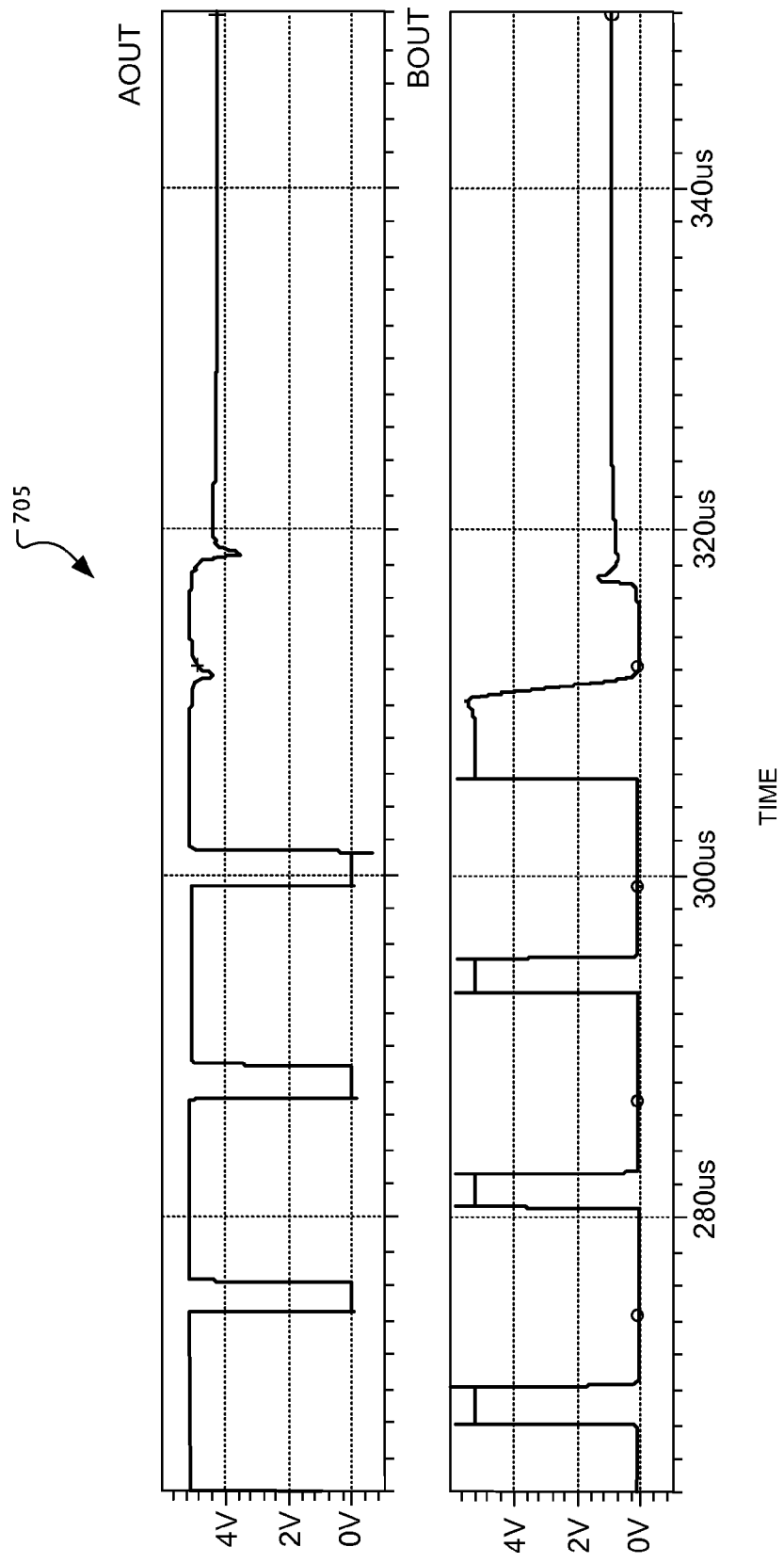
FIG. 7A shows an example of a voltage profile of a non-synchronized switch from a high current PSM mode to a linear mode.
Figure 7B:
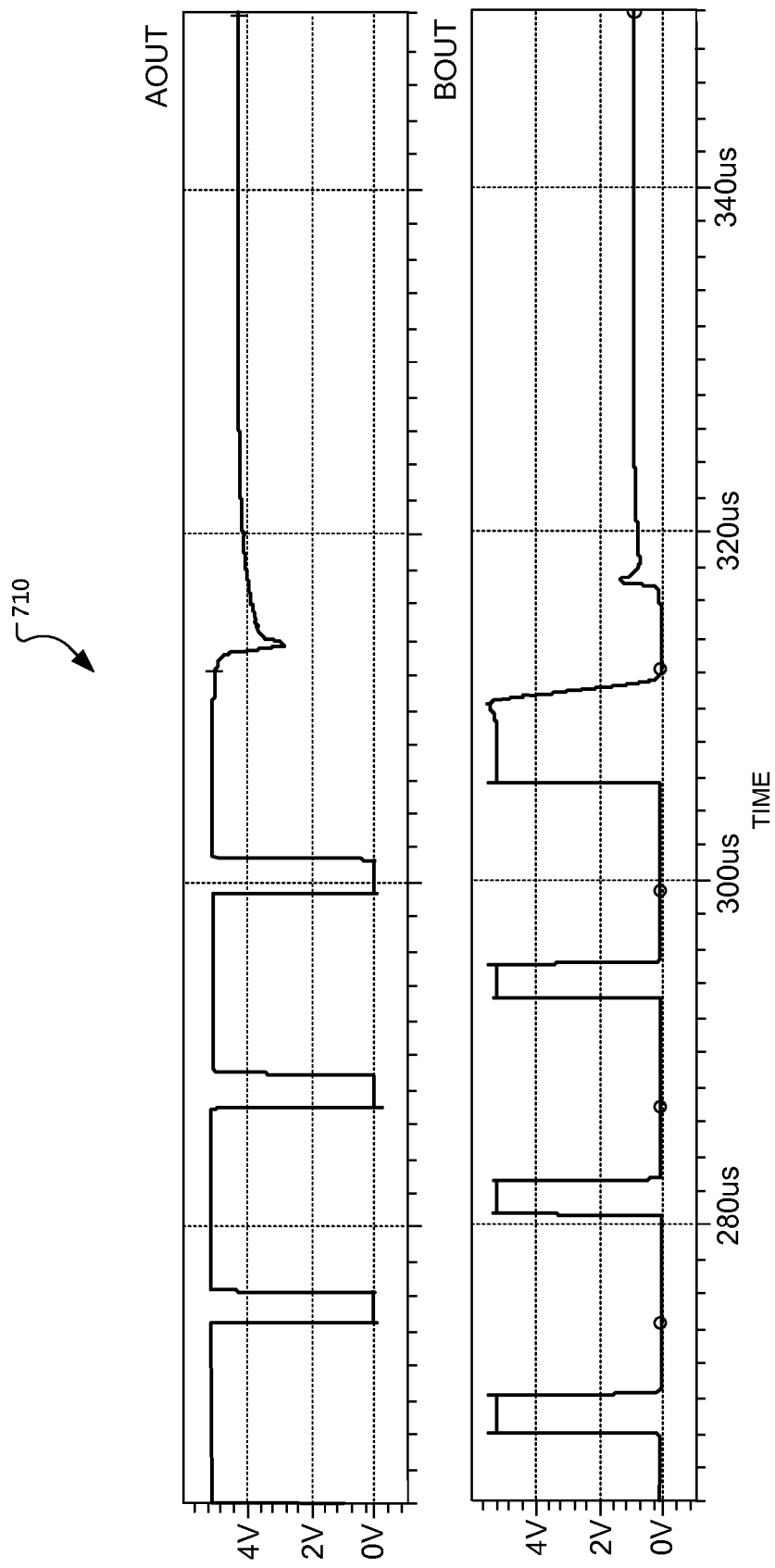
FIG. 7B shows an example of a voltage profile of a synchronized switch from a high current PSM mode to a linear mode.
Figure 7C:
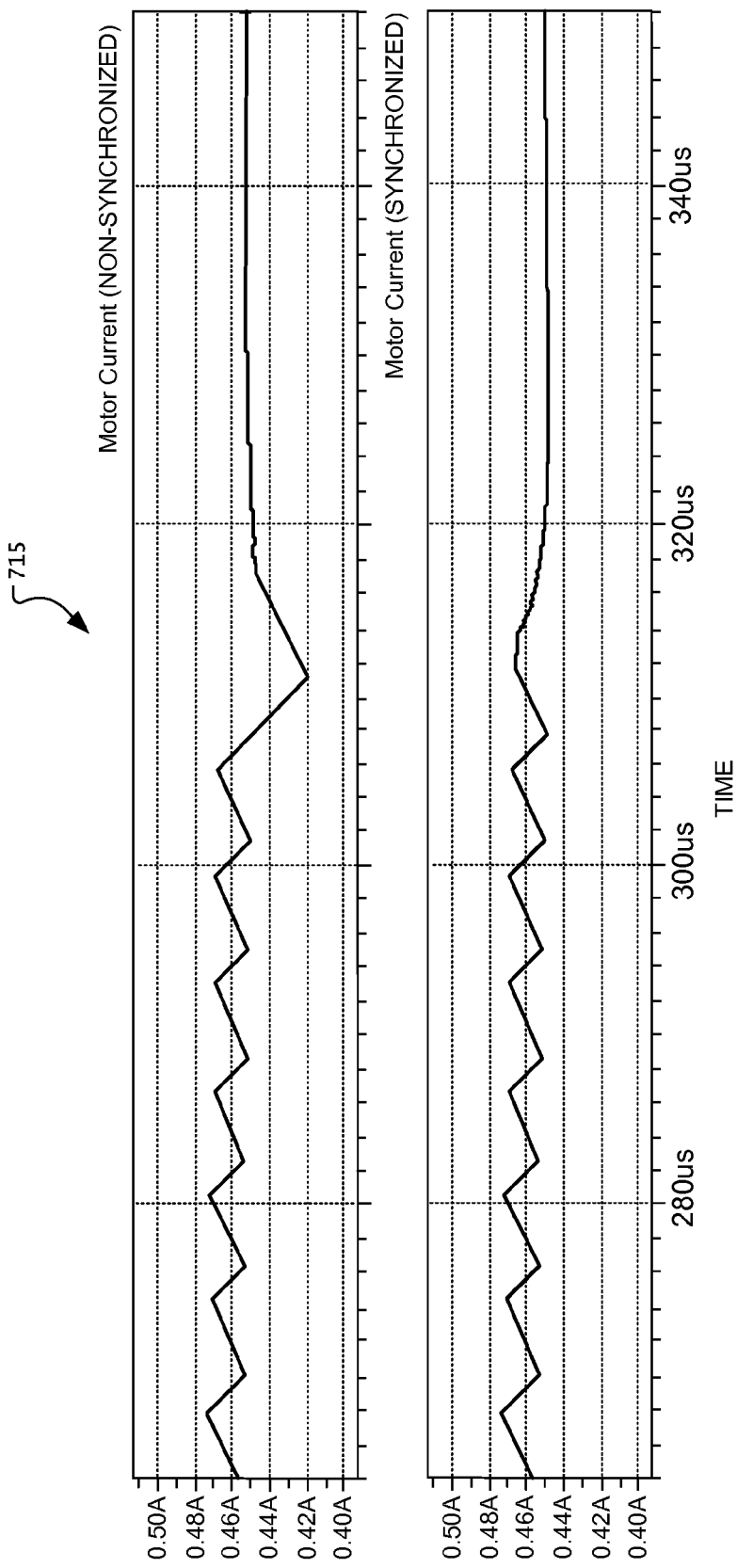
FIG. 7C shows an example of current profiles of synchronized and non-synchronized switches from a high current PSM mode to a linear mode.

FIGS. 7A, 7B, and 7C show examples of simulation results that include comparisons between a non-synchronized switch and a synchronized switch from a high current PSM mode to a linear mode. In this example, a synchronized switch takes place at the beginning of a charging state. The start up time of the linear pre-driver can be configured to be shorter than the charging period of a high current PSM mode to minimize or eliminate current spikes to the VCM.

FIG. 7A shows an example of a voltage profile of a non-synchronized switch from a high current PSM mode to a linear mode. Graphs 705 include a voltage profile of AOUT and a voltage profile of BOUT that show a non-synchronized switch from a high current PSM mode to a linear mode. AOUT and BOUT correspond to respective amplifier output such as the amplifiers in VCM system 350.

FIG. 7B shows an example of a voltage profile of a synchronized switch from a high current PSM mode to a linear mode. Graphs 710 include a voltage profile of AOUT and a voltage profile of BOUT that show a synchronized switch from a high current PSM mode to a linear mode.

FIG. 7C shows an example of current profiles of synchronized and non-synchronized switches from a high current PSM mode to a linear mode. Graphs 715 include a motor current profile for a non-synchronized switch from a high current PSM mode to a linear mode and a motor current profile for a synchronized switch from a high current PSM mode to a linear mode. Note that, in this example, the non-synchronized switch causes a greater motor current ripple than the synchronized switch.

A voice coil motor synchronization architecture can use the motor current to determine the timing of switching between modes. In some implementations, motor current data can be used to determine which state, between charging and discharging state, has a longer period. Information such as the duty cycle of a drive or CCL current digital-to-analog (DAC) value can be used to ascertain motor current. The synchronization architecture can opt to switch at a state with a longer period, e.g., choosing between the charging and discharging state. The synchronization architecture can select a charging or discharging state with the longer period. The synchronization architecture can perform the switch between modes at the beginning of the selected state. In some implementations, a CCL current digital-to-analog (DAC) value can be used to decide which state to switch. In some implementations, a HDD system can use an output transition edge to determine the point of switching from a digital to an analog mode.

Figure 8:
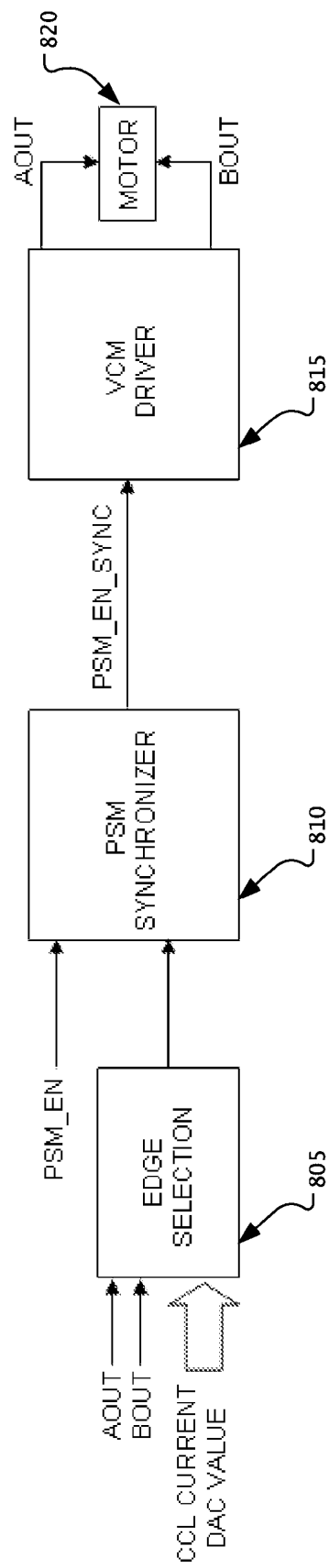
FIG. 8 shows an example of a voice coil motor synchronization architecture.

FIG. 8 shows an example of a voice coil motor synchronization architecture. A HDD system can use a transition edge to determine the point of switching from a power modulation mode to a linear mode. A HDD system can include an edge selection unit 805, a PSM synchronizer 810, a VCM driver 815, and a VCM 820.

The VCM driver 815 can include circuitry for a power modulation mode. The VCM driver 815 can include circuitry for a linear mode. In some implementations, the VCM driver 815 is configured to supply current to the VCM 820 via two current conduits, e.g., AOUT and BOUT as shown in FIG. 8.

The edge selection unit 805 can monitor AOUT and BOUT to detect a change between states of a power modulation mode. The edge selection unit 805 can output a signal to a PSM synchronizer 810 to signal a state change. In some implementations, the edge selection unit 805 can use a CCL current DAC value to select a state of the power modulation mode to make a transition to a linear mode. In some implementations, the edge selection unit 805 can measure actual CCL current and select a state of the power modulation mode, e.g., selecting a discharging or charging state, to make the transition to a linear mode based on the measured current. In some implementations, the edge selection unit 805 can determine a duty cycle of a PSM waveform and select a either a discharging or charging state of the power modulation mode to make a transition to a linear mode based on the duty cycle.

The PSM synchronizer 810 can output a signal, e.g., PSM_EN_SYNC, to initiate a transition from a power modulation mode to a linear mode in the VCM driver 815. The PSM synchronizer 810 can receive information including a signal indicative of whether a PSM mode is enabled, e.g., PSM_EN, and an output from the edge selection unit 805. In some implementations, a controller module sends a signal, e.g., PSM_EN, to the PSM synchronizer 810 to indicate that the PSM mode should be engaged. In some implementations, if PSM_EN indicates that the PSM mode should be engaged and an output from the edge selection unit 805 indicates a transition period, then the PSM synchronizer 810 can set PSM_EN_SYNC to control the VCM driver 815 to transition from a power modulation mode to a linear mode.

The VCM driver 815 can deactivate circuitry associated with the power modulation mode and activate circuitry associated with the linear mode based on the signal from the PSM synchronizer 810. In some implementations, the edge selection unit 805, the PSM synchronizer 810, and the VCM driver 815 can be implemented in one or more circuits.

In some implementations, a control module associated with a VCM driver can select when to transition to a linear mode. In some implementations, a control module uses a CCL current DAC to determine when to transition from a power modulation mode to a linear mode. In some implementations, an opportunity to transition is when the current slope is the most gentle. When motor current is high, then a charging state may become longer than a discharging state. In some implementations, a method of determining a transition opportunity is based on an analysis of the current slope and duty cycles of the AOUT or BOUT to determine which current slope is better to use, e.g., a slope associated with a charging state or a slope associated with a discharging state. In some implementations, a duty cycle of 75% for AOUT and 25% for BOUT is the cutoff between whether a charging or a discharging current slope is used to make the transition. In some implementations, duty cycles of 50% for AOUT and 50% BOUT represents the point of zero current. Duty cycles between 50% for AOUT and 50% for BOUT and 75% for AOUT and 25% for BOUT can be classified as a low current PSM where the direction is from AOUT to BOUT. In this scenario, a controller can select a discharging period to make the switch. Additionally, duty cycles between 50% for AOUT and 50% for BOUT to 25% for AOUT and 75% for BOUT can be classified as low current PSM, where the direction is from BOUT to AOUT. In this scenario, a controller can also select the discharging period to make the switch.

Figure 9:
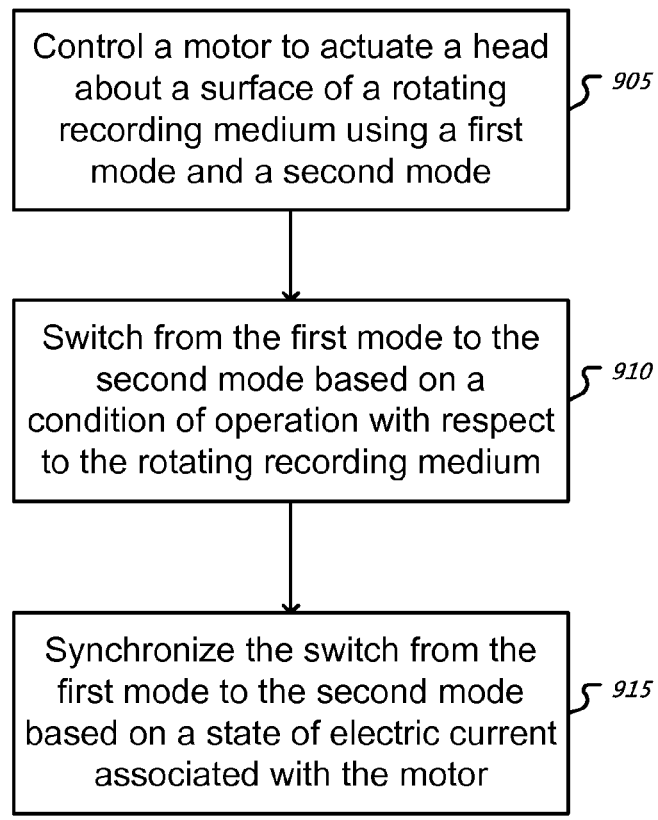
FIG. 9 shows an example of a synchronized mode switching process.

FIG. 9 shows an example of a synchronized mode switching process. A synchronized mode switching process can include, at 905, controlling a motor to actuate a head about a surface of a rotating recording medium using a first mode and a second mode. Controlling the motor can include using the first mode to control the motor for a seeking operation that includes moving the head to a specific track on the rotating recording medium. Controlling the motor can include using the second mode to control the motor for a track following operation that includes maintaining the head on a specific track on the rotating recording medium.

At 910, the synchronized mode switching process can include switching from the first mode to the second mode based on a condition of operation with respect to the rotating recording medium. In some implementations, the process can generate a signal to tri-state one or more pre-drivers associated with the first mode and to activate one or more pre-drivers associated with the second mode. Various examples of operating conditions include a seek operation and a track following operation.

At 915, the synchronized mode switching process can include synchronizing the switch from the first mode to the second mode based on a state of electric current associated with the motor. In some cases, the state of current associated with the motor can be indicative of a discharging state of the first mode. In such cases, a duration of the discharging state can be longer than a duration of a charging state associated with the first mode. Therefore, synchronizing the switch can include initiating the switch at a beginning of the discharging state. In some cases, the state of current associated with the motor is indicative of a charging state of the first mode. In such cases, a duration of the charging state can be longer than a duration of a discharging state associated with the first mode. Therefore, synchronizing the switch can include initiating the switch at a beginning of the charging state.

Figure 10:
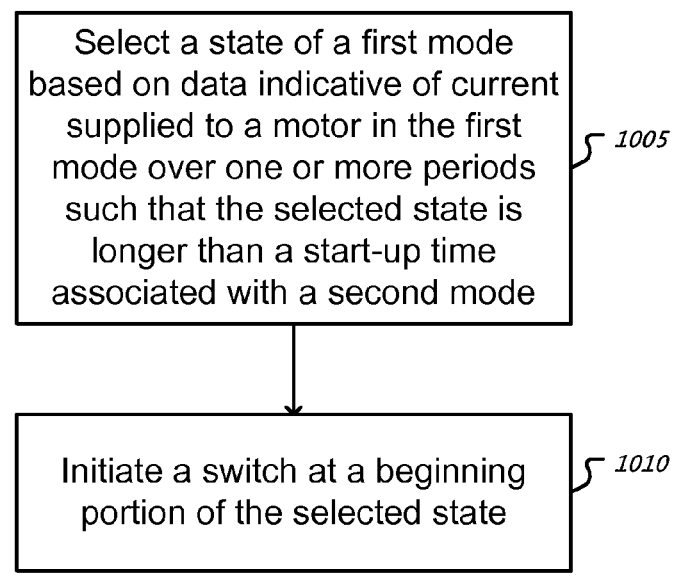
FIG. 10 shows another example of a synchronized mode switching process.

FIG. 10 shows another example of a synchronized mode switching process. A synchronized mode switching process can include, at 1005, selecting a state of a first mode based on data indicative of current supplied to a motor in the first mode over one or more periods such that the selected state is longer than a start-up time associated with a second mode. In some implementations, selecting a state can include determining a duty cycle based on one or more waveforms associated with the first mode. In some implementations, selecting a state can include accessing a current loop current digital-to-analog value associated with the first mode. In some implementations, selecting a state can include measuring the current to the motor. At 1010, the process synchronized mode switching can initiate a switch, e.g., from the first mode to the second mode, at a beginning portion of the selected state.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method, comprising:
controlling a motor to actuate a head about a surface of a rotating recording medium, the motor being associated with first and second states of electric current, wherein a duration of the first state is longer than a duration of the second state, wherein controlling the motor comprises operating first pre-driver circuitry that controls current to the motor under a first mode and operating second pre-driver circuitry that controls current to the motor under a second mode;
detecting an instance of the first state; and
initiating, when the instance of the first state is detected, a switch from the first mode to the second mode to control the motor, wherein the switch is based on a condition of operation with respect to the rotating recording medium, wherein the switch comprises activating the second pre-driver circuitry and deactivating the first pre-driver circuitry, and wherein a start-up time of the second pre-driver circuitry is shorter than the duration of the first state.

2. The method of claim 1, wherein initiating the switch comprises initiating the switch at a beginning of the instance of the first state.

3. The method of claim 2, wherein the duration of the first state is longer than a start-up time associated with the second mode, the start-up time associated with the second mode including the start-up time of the second pre-driver circuitry.

4. The method of claim 1, wherein the first state is a discharging state.

5. The method of claim 1, wherein the first state is a charging state.

6. The method of claim 1, wherein detecting the instance of the first state comprises monitoring whether the motor is charging or discharging.

7. The method of claim 1, wherein the first mode is a power modulation mode, and the second mode is a linear mode.

8. The method of claim 1, wherein controlling the motor comprises:
using the first mode to control a voice coil motor for a seeking operation that includes moving the head to a specific track on the rotating recording medium; and
using the second mode to control the voice coil motor for a track following operation that includes maintaining the head on a specific track on the rotating recording medium.

9. An apparatus, comprising:
circuitry configured to control a motor to actuate a head about a surface of a rotatable recording medium, the motor being associated with first and second states of electric current, wherein a duration of the first state is longer than a duration of the second state, wherein the circuitry comprises first pre-driver circuitry that controls current to the motor under a first mode and second pre-driver circuitry that controls current to the motor under a second mode; and circuitry configured to cause a switch from the first mode to the second mode to control the motor, wherein the switch comprises an activation of the second pre-driver circuitry and a deactivation of the first pre-driver circuitry, wherein a start-up time of the second pre-driver circuitry is shorter than the duration of the first state, wherein the switch is based on a condition of operation with respect to the rotatable recording medium, and wherein the switch is initiated based on a detection of the motor being in the first state.

10. The apparatus of claim 9, wherein the switch is initiated at a beginning of the first state.

11. The apparatus of claim 10, wherein the duration of the first state is longer than a start-up time associated with the second mode, the start-up time associated with the second mode including the start-up time of the second pre-driver circuitry.

12. The apparatus of claim 9, wherein the first state is a discharging state.

13. The apparatus of claim 9, wherein the first state is a charging state.

14. The apparatus of claim 9, wherein the first mode is a power modulation mode, and the second mode is a linear mode.

15. A system, comprising:
a rotatable recording medium;
a head to read and/or write data to the rotatable recording medium;
a motor configured to actuate the head about a surface of the rotatable recording medium, the motor being associated with first and second states of electric current, wherein a duration of the first state is longer than a duration of the second state;
a driver configured to supply current to the motor to operate the motor using a first mode and a second mode, wherein the driver comprises first pre-driver circuitry that controls current to the motor under the first mode and second pre-driver circuitry that controls current to the motor under the second mode; and
a controller configured to operate the driver to switch from the first mode to the second mode based on a condition of operation with respect to the rotatable recording medium and initiate the switch from the first mode to the second mode based on a detection of the motor being in the first state, wherein the controller is configured to cause an activation of the second pre-driver circuitry in response to initiating the switch and cause a deactivation of the first pre-driver circuitry in response to initiating the switch, and wherein a start-up time of the second pre-driver circuitry is shorter than the duration of the first state.

16. The system of claim 15, wherein the switch is initiated at a beginning of the first state.

17. The system of claim 16, wherein the duration of the first state is longer than a start-up time associated with the second mode, the start-up time associated with the second mode including the start-up time of the second pre-driver circuitry.

18. The system of claim 15, wherein the first state is a discharging state.

19. The system of claim 15, wherein the first state is a charging state.

20. The system of claim 15, wherein the first mode is a power modulation mode, and the second mode is a linear mode.

21. The system of claim 15, wherein the driver comprises:
a first amplifier to supply first current to the motor, wherein the first pre-driver circuitry and the second pre-driver circuitry are electrically coupled with the first amplifier; and
a second amplifier to supply second current to the motor, wherein the first pre-driver circuitry and the second pre-driver circuitry are electrically coupled with the first amplifier.

22. The system of claim 21, wherein the controller causes pre-drivers of the first pre-driver circuitry to be tri-stated to deactivate the first pre-driver circuitry such that the pre-drivers are effectively disconnected from the first and second amplifiers.

* * * * *